(12) United States Patent
Omotani

(10) Patent No.: US 7,082,388 B2
(45) Date of Patent: Jul. 25, 2006

(54) FLUTTER TEST MODEL

(75) Inventor: Hideo Omotani, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 850 days.

(21) Appl. No.: 10/000,023

(22) Filed: Dec. 4, 2001

(65) Prior Publication Data

US 2002/0069040 A1 Jun. 6, 2002

(30) Foreign Application Priority Data

Dec. 5, 2000 (JP) ............................. 2000-370217

(51) Int. Cl.
*G06G 7/48* (2006.01)
(52) U.S. Cl. ............................................ 703/8; 73/147
(58) Field of Classification Search .................... 703/8;
73/147; 244/99.13, 174
See application file for complete search history.

(56) References Cited

U.S. PATENT DOCUMENTS

| | | | |
|---|---|---|---|
| 3,224,265 A * | 12/1965 | Mazelsky et al. | 73/147 |
| 3,790,106 A * | 2/1974 | Sweeney et al. | 244/203 |
| 4,343,447 A * | 8/1982 | Reed, III | 244/137.4 |
| 4,372,159 A * | 2/1983 | Doggett et al. | 73/147 |
| 4,475,385 A * | 10/1984 | Farmer | 73/147 |
| 4,809,553 A * | 3/1989 | Reed, III | 73/583 |

FOREIGN PATENT DOCUMENTS

JP 7-27665 1/1995

OTHER PUBLICATIONS

Edwards et al., NASA: MAVRIC Flutter Model Transonic Limit Cycle Oscillation Test, May 2001.*

* cited by examiner

*Primary Examiner*—Albert W. Paladini
(74) *Attorney, Agent, or Firm*—Arent Fox PLLC

(57) ABSTRACT

A flutter test model is provided that utilizes a novel approach for fixing wing elements to an elastic spar, resulting in reduced airflow disturbance. A test wing has an elastic spar that simulates the elasticity of a wing of an actual airplane, and a plurality of wing elements that simulate the external shape of the wing of the actual airplane. A pair of fore and aft anchor members are fixed to the elastic spar by bolts, the wing element that is formed by stereolithography is fitted around the anchor members from the wing tip side, and the wing element is fastened to the anchor members by bolts that run through the wing element from the wing tip side. A weight, which is a tungsten rod, is housed in a weight support hole formed in the wing element. The anchor members and the bolts are not exposed on the surface of the wing element and the airflow over the surface of the test wing is not disturbed when a flutter test is carried out in a wind tunnel, thereby enhancing the accuracy of the flutter test.

12 Claims, 8 Drawing Sheets

FLUTTER TEST MODEL

BACKGROUND OF THE INVENTION

1. Field of the Invention

The present invention relates to a flutter test model that includes an elastic spar that simulates the elasticity of an actual wing, and a plurality of wing elements that simulate the external shape of the actual wing, the plurality of wing elements being fixed along the elastic spar to form a test wing.

2. Description of Related Art

A flutter test model for measuring the flutter characteristics of a main wing of an actual airplane by a wind-tunnel test is known, for example, in Japanese Patent Application Laid-open No. 7-27665.

This flutter test model is formed by fixing a plurality of wing elements to an elastic spar made of metal, the wing elements being shaped using balsa wood and divided in the span direction, and the elastic spar simulating the flexural rigidity and the torsional rigidity of the main wings of the actual airplane. Bolts are used for fixing the wing elements to the elastic spar.

However, fixing a wing element to an elastic spar by means of a bolt has the problem that the top of the bolt projects above the surface of the wing element, thereby disturbing the airflow and preventing an accurate flutter test from being carried out. Even when a hole is formed on the surface of the main wing and the top of the bolt is sunk within the hole, there is still the problem that, since the hole disturbs the airflow over the surface of the main wing, an accurate flutter test is prevented.

SUMMARY OF THE INVENTION

The present invention has been conducted under the above-mentioned circumstances, and it is an object of the present invention to prevent airflow disturbance caused by fixing means for fixing a wing element to an elastic spar in a flutter test model.

In order to achieve the above-mentioned object, there is proposed a flutter test model that includes an elastic spar that simulates the elasticity of an actual wing, and a plurality of wing elements that simulate the external shape of the actual wing, the plurality of wing elements being fixed along the elastic spar so as to form a test wing, wherein disposed within the wing element is connecting means for connecting the wing element to the elastic spar, the connecting means not being exposed on the surface of the test wing.

In accordance with the above-mentioned arrangement, since the connecting means for connecting the wing element to the elastic spar is disposed within the wing element, the connecting means is not exposed on the surface of the test wing, and when a flutter test is carried out in a wind tunnel the airflow over the surface of the test wing is not disturbed by the connecting means, thereby enhancing the accuracy of the flutter test.

Furthermore, in addition to the arrangement of the invention described above, there is provided a flutter test model wherein the connecting means includes an anchor member that is fixed to the elastic spar, and a bolt that fixes the wing element to the anchor member, the wing element being fitted around the elastic spar and the anchor member from the wing tip side, and the bolt passing through the wing element from the wing tip side and being fastened to the anchor member.

In accordance with the above-mentioned arrangement, since the wing element is fitted from the wing tip side around the elastic spar and the anchor member fixed to the elastic spar, and the wing element is fastened to the anchor member by means of a bolt that is inserted from the wing tip side, the anchor member and the bolt are not exposed on the surface of the test wing, thereby easily and reliably fixing the wing element to the elastic spar.

Furthermore, in addition to the arrangements described above, there is provided a flutter test model wherein the wing element or the anchor member is provided with a weight support hole, the weight support hole housing a weight.

In accordance with the above-mentioned arrangement, since the weight is supported in the weight support hole formed in the wing element or the anchor member, an accurate flutter test can be carried out by simulating the weight distribution of an actual wing.

The connecting means of the present invention corresponds to an anchor member 16 and a bolt 21 of an embodiment.

BRIEF DESCRIPTION OF THE DRAWINGS

An embodiment of the present invention is explained below by reference to elements illustrated in the appended drawings.

FIG. 1 is a perspective view of a wind-tunnel test model.
FIG. 2 is an exploded perspective view of a test wing.
FIG. 3 is a view from arrow 3 in FIG. 2.
FIG. 4 is a cross section at line 4—4 in FIG. 3.
FIG. 5 is a cross section at line 5—5 in FIG. 4.
FIG. 6 is a cross section at line 6—6 in FIG. 3.
FIG. 7 is a cross section at line 7—7 in FIG. 6.
FIG. 8 is a diagram for explaining the steps in molding a wing element by stereolithography.

DETAILED DESCRIPTION OF PREFERRED EMBODIMENT

Figure 1:
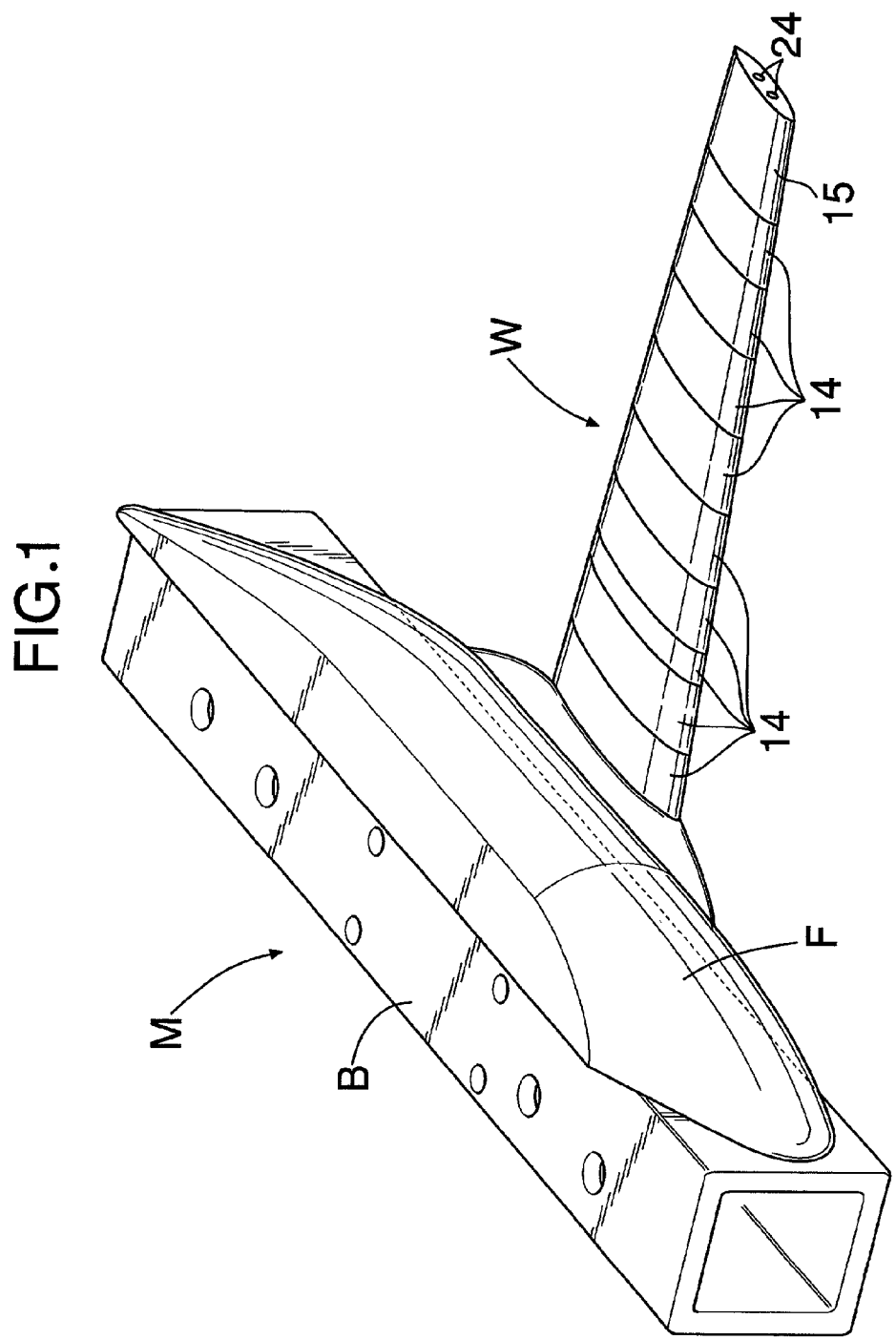
FIGS. 1 to 8 illustrate one embodiment of the present invention.

FIG. 1 shows a wind-tunnel test model M with which a flutter test for a main wing of an airplane is carried out. Since the shape of an airplane is symmetrical and the manner in which air flows around it is also symmetrical, the wind-tunnel test model M has only a left half of a fuselage F and a left test wing W, which are on the left side of a vertical plane passing through the axis of the airplane. Formed integrally on the right side face of the fuselage F is a support bracket B for supporting the wind-tunnel test model M in a wind tunnel.

Figure 2:
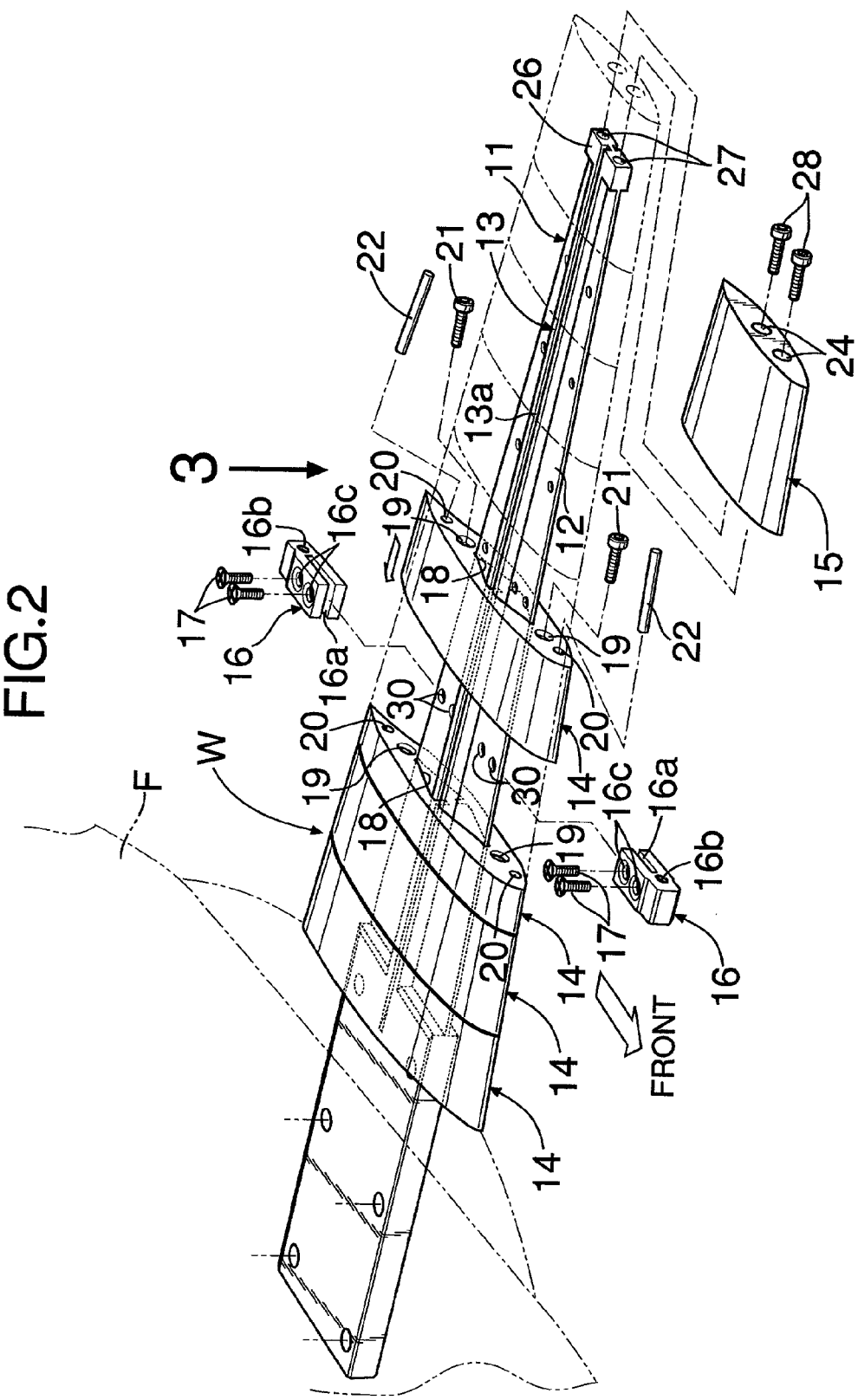
Figure 3:
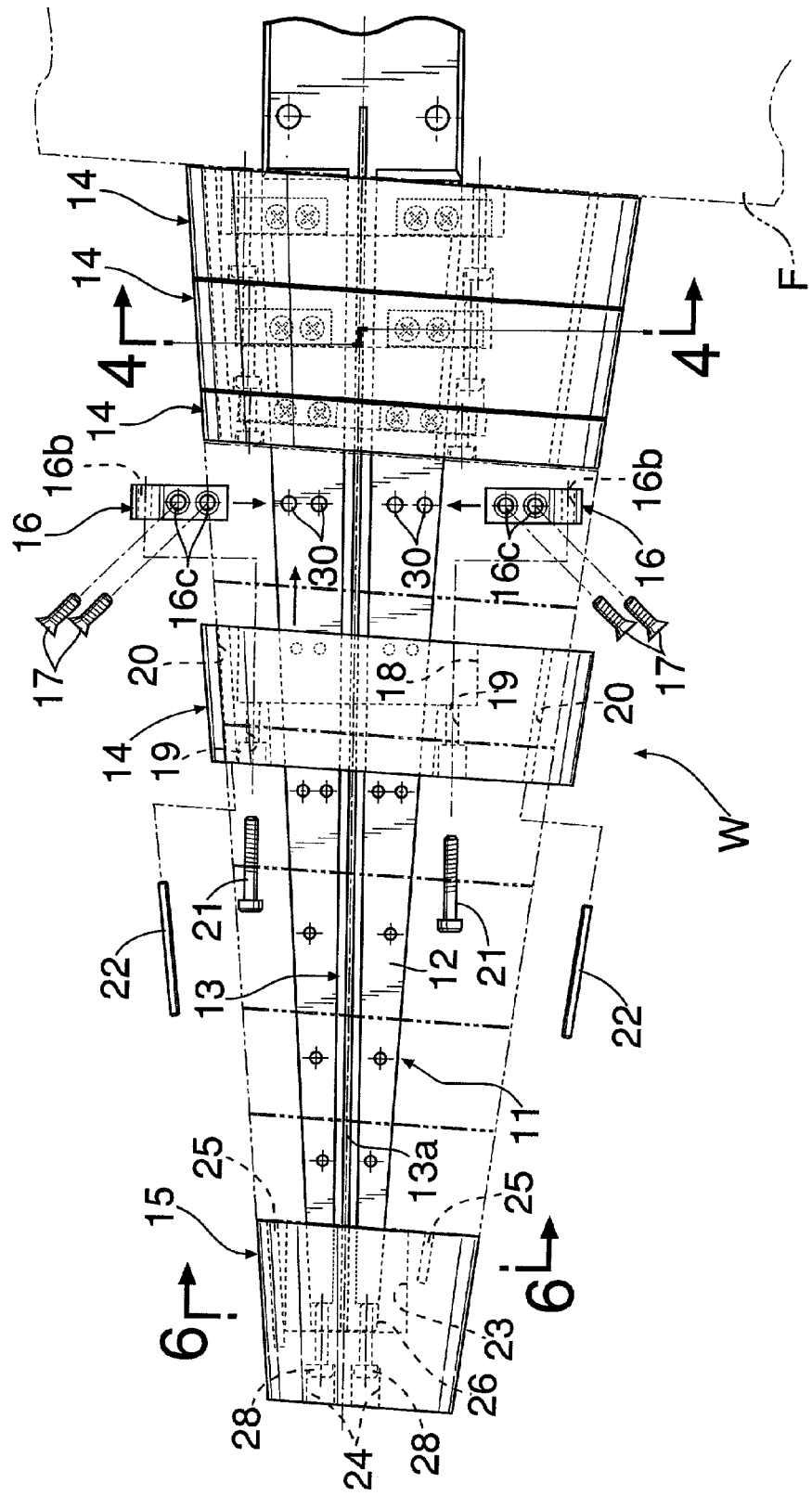
Figure 4:
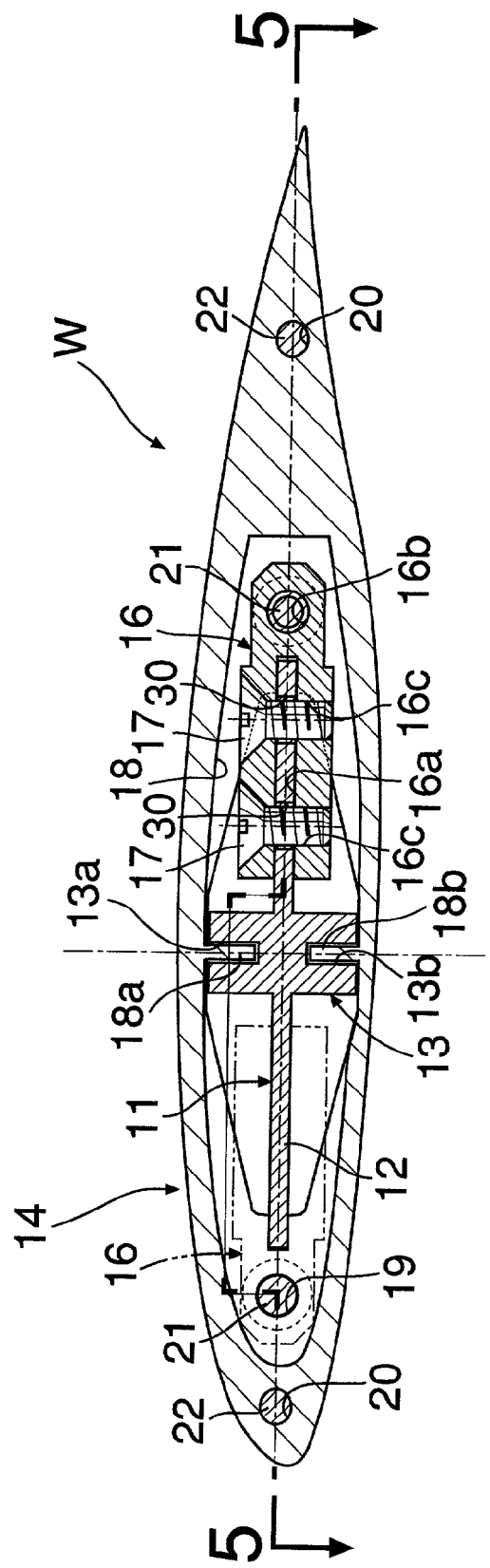
Figure 5:
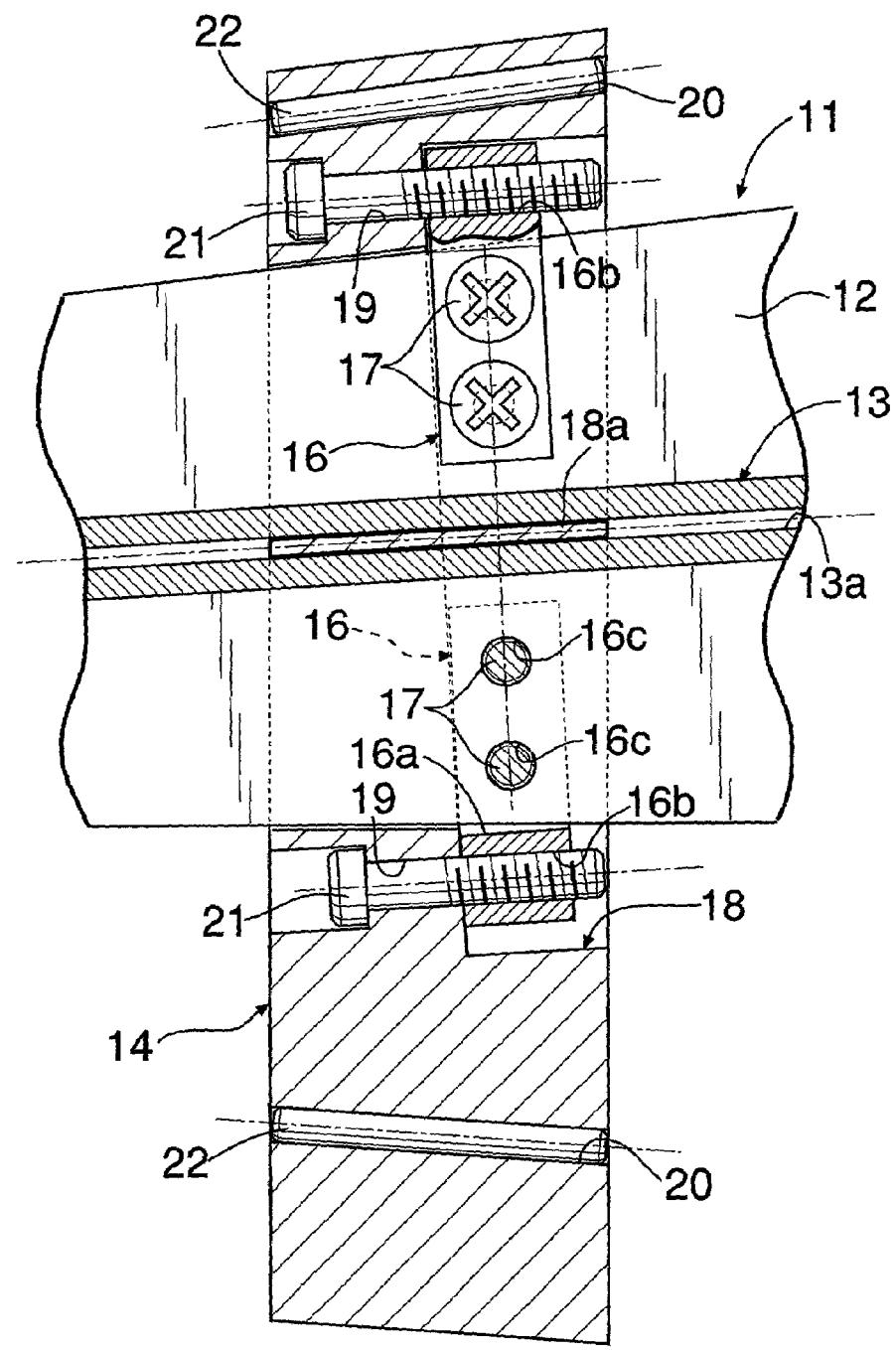
Figure 6:
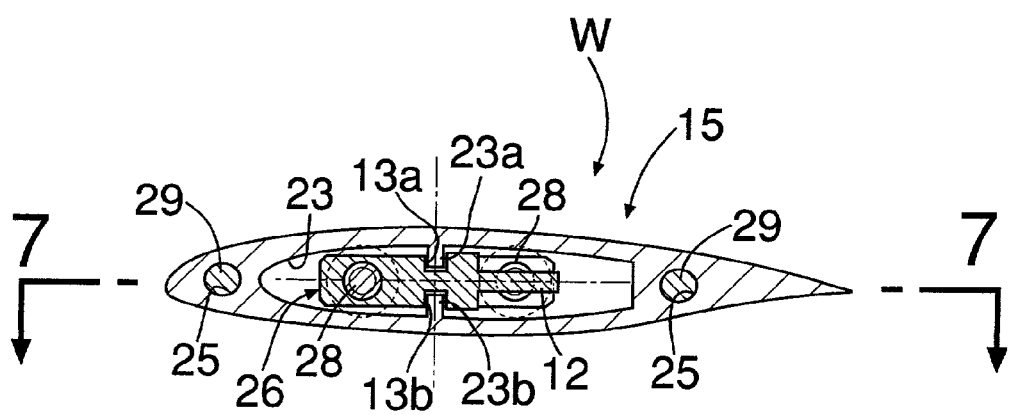
Figure 7:
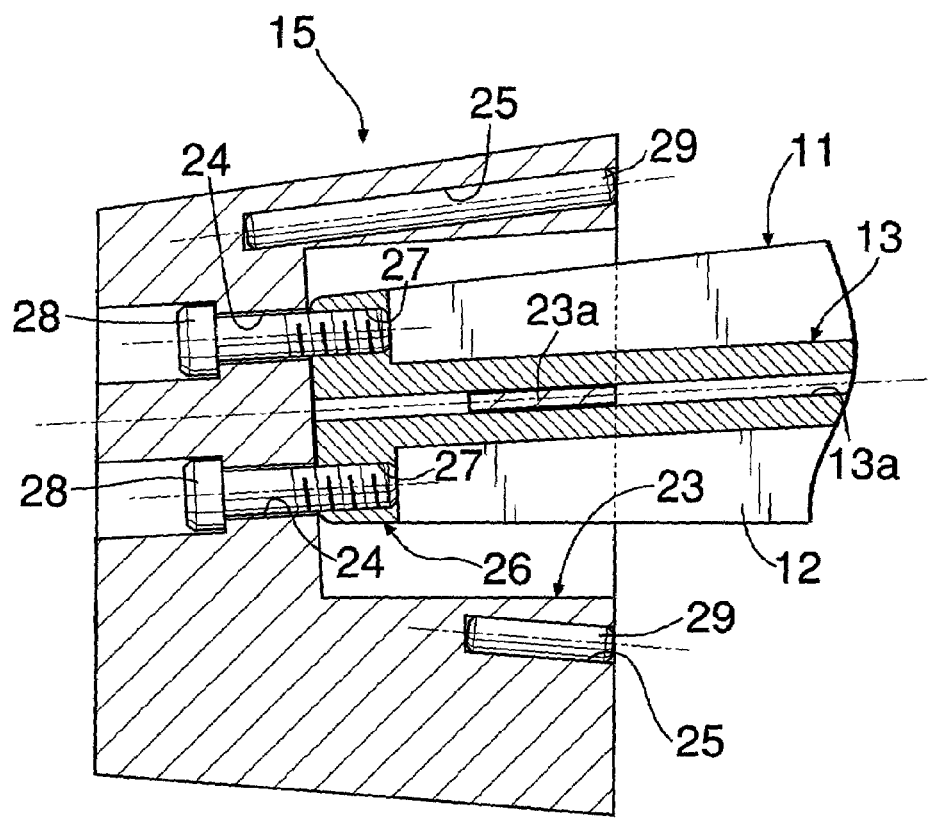

As is clear by referring to FIG. 2 together with FIG. 3, the test wing W has an elastic spar 11 made of metal, the elastic spar 11 forming a framework for the test wing W. The elastic spar 11 is formed from a plate 12 and a core 13, the plate 12 tapering down from the wing root toward the wing tip, and the core 13 having an H-shaped cross section and being formed integrally on a middle part, in the fore-and-aft direction, of the plate 12. Formed on the upper and lower faces of the core 13 are slits 13a and 13b respectively (FIG. 4), which extend in the span direction. The elastic spar 11 is made in terms of its shape, dimensions, materials, etc. so as to simulate the flexural rigidity and the torsional rigidity of a main wing of an actual airplane. Fixed to the elastic spar 11 are wing elements 14–15 that are divided into 10 in the span direction, thereby forming a test wing W. Minute gaps are formed between adjacent wing elements 14–15, thereby preventing interference with the flexural deformation and the torsional deformation of the elastic spar 11. Each of the wing elements 14–15 is made by stereolithography.

A process for forming one wing element 14 among the wing elements 14–15 by stereolithography is now explained by reference to the schematic diagram of FIGS. 8A to 8D.

Figure 8A:
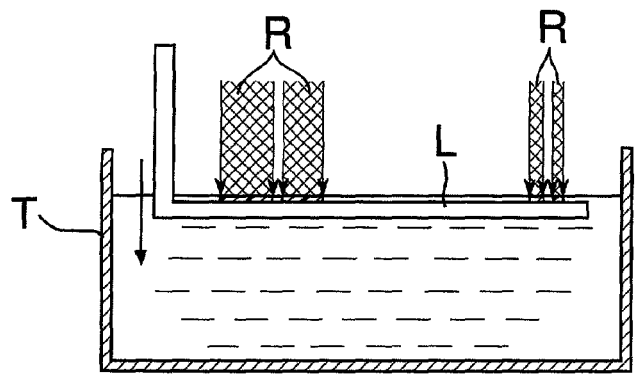
Figure 8B:
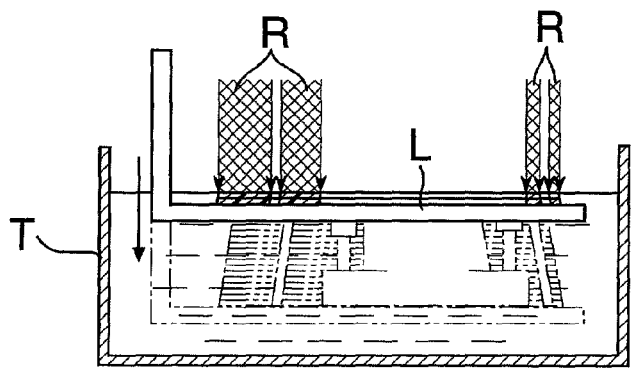

As shown in FIG. 8A, an elevator platform L is provided in a vertically movable manner within a tank T filled with a photocurable resin. The elevator platform L is connected to a drive source (not illustrated). In a state in which the upper face of the elevator platform L is positioned below the surface of the photocurable resin by only one pitch (for example, 0.1 mm), a thin film of the photocurable resin on the elevator platform L is irradiated with a UV laser R in a predetermined pattern, thereby curing the photocurable resin that is present in the irradiated area to form a first resin layer. Subsequently, as shown in FIG. 8B, after the elevator platform L is lowered by one pitch, a thin film of the photocurable resin that covers the first resin layer is irradiated with the UV laser R in a predetermined pattern, thereby curing the photocurable resin that is present in the irradiated area to form a second resin layer on the top of the first resin layer.

Figure 8C:
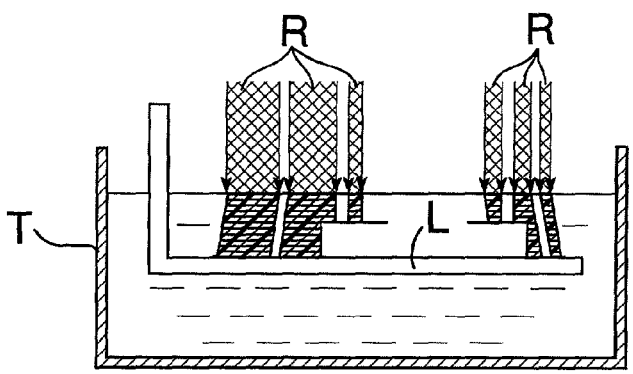
Figure 8D:
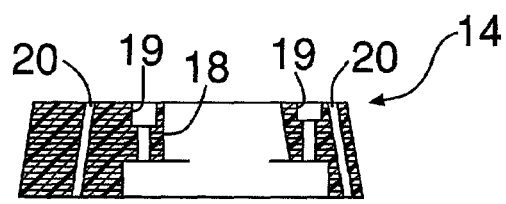

As described above, the UV laser R is applied every time the elevator platform L is lowered by one pitch, thereby forming the whole wing element 14 portion by portion from the wing root side to the wing tip side (FIG. 8C). Since the test wing W of the present embodiment is a tapered wing, the range over which the UV laser R is applied is the widest when the section on the wing root side is molded, and the range over which it is applied decreases as the molding progresses toward the section on the wing tip side. A space that is to be formed within the test wing W is simultaneously formed by stereolithography (FIG. 8D). That is to say, when an area corresponding to the space is not irradiated with the UV laser R, the photocurable resin in the area is not cured and the area remains as a space.

Referring to FIGS. 2 to 6, a method is explained for attaching nine wing elements 14 on the wing root side, excluding the wing element 15 farthest on the wing tip side. Each wing element 14 is fixed to the elastic spar 11 using two anchor members 16 having a slit 16*a*, the plate 12 of the elastic spar 11 being fitted into the slit 16*a* from the fore-and-aft direction and each anchor member 16 being fastened by means of two bolts 17 inserted through bolt holes 16*c* into bolt holes 30 of the elastic spar 11. The wing element 14 has a stepped recess 18, a pair of fore and aft bolt holes 19, and a pair of fore and aft weight support holes 20. Formed on the upper and lower parts of the recess 18 are projections 18*a* and 18*b* respectively, which extend in the span direction. When the recess 18 of the wing element 14 is fitted around the outer periphery of the elastic spar 11, the pair of projections 18*a* and 18*b* formed in the recess 18 engage with the pair of slits 13*a* and 13*b* respectively of the core 13 of the elastic spar 11, thereby positioning the wing element 14 relative to the elastic spar 11.

At this point, the step in the recess 18 of the wing element 14 comes into contact with the pair of anchor members 16, and in this state two bolts 21 are inserted into the pair of fore and aft bolt holes 19 of the wing element 14 from the wing tip side and screwed into corresponding bolt holes 16*b* formed in the anchor members 16, thereby fixing the wing element 14 to the elastic spar 11. Each of the wing elements 14 has weight support holes 20, in which weights 22, which are metal rods made of a metal having a high specific gravity such as tungsten, are fixed by press fitting. Changing the weight and position of the weights 22 can simulate the weight distribution of the main wing of an actual airplane. The nine wing elements 14 are fixed to the elastic spar 11 in succession from the wing root side to the wing tip side in accordance with the above-mentioned method.

The wing element 15 farthest on the wing tip side is fixed by a different method. That is to say, as shown in FIGS. 2, 3, 6, and 7, the wing element 15 has a recess 23, a pair of fore and aft bolt holes 24, and a pair of fore and aft weights 25. Formed on the upper and lower parts of the recess 23 are projections 23*a* and 23*b* respectively, which extend in the span direction. The elastic spar 11 has a boss 26 on its extremity, and a pair of bolt holes 27 are formed in the boss 26. The wing element 15 is fixed so that the recess 23 is fitted over the elastic spar 11 from the wing tip side toward the wing root and the pair of projections 23*a* and 23*b* formed in the recess 23 are engaged with the pair of slits 13*a* and 13*b* respectively that extend from the core 13 to the boss 26. In this state, bolts 28 are inserted into the pair of fore and aft bolt holes 24 of the wing element 15 from the wing tip side and screwed in the pair of bolt holes 27 formed in the boss 26, thereby fixing the wing element 15 to the elastic spar 11. The wing element 15 has weight support holes 25, in which weights 29, which are metal rods made of a metal having a high specific gravity such as tungsten, are fixed by press fitting so as to simulate the weight distribution of the main wing of an actual airplane.

As hereinbefore described, since the wing element 14 is fixed to the elastic spar 11 by the anchor members 16 and the bolts 21 that are housed within the recess 18 of the wing element 14, the connecting means is not exposed on the surface of the wing element 14. When carrying out a flutter test by setting the wind-tunnel test model M in a wind tunnel, the airflow over the surface of the test wing W is not disturbed by the connecting means, thus enhancing the accuracy of the flutter test. Moreover, since the wing element 15 farthest on the wing tip side is also fixed to the boss 26 of the elastic spar 11 by means of the two bolts 28, the bolts 28 do not disturb the airflow over the surface of the test wing W.

Furthermore, since the weights 22 are supported in the weight support holes 20 of the wing elements 14 and the weights 29 are supported in the weight support holes 25 of the wing element 15, the test wing W can precisely simulate the weight distribution of the main wing of an actual airplane, thereby enhancing the accuracy of the flutter test. Moreover, since the wing elements 14 and 15 are formed by stereolithography, not only can time and cost be saved in comparison with a case in which the wing elements 14 and 15 are molded using balsa wood or FRP, but also the dimensional precision can be greatly enhanced. Moreover, since the wing elements 14 are fixed to the elastic spar 11 via the anchor members 16, the wing elements 14, which are made from a photocurable resin and have a comparatively low rigidity, can be reinforced so as to have enhanced rigidity.

An embodiment of the present invention has been described in detail above, but the present invention can be modified in a variety of ways without departing from the spirit and scope of the invention.

For example, in the embodiment the weights 22 are housed in the weight support holes 20 formed in the wing element 14, but it is also possible to house the weights in weight support holes formed in the anchor members 16. In the embodiment, two anchor members 16 are used for fixing one wing element 14, but it is also possible to integrate the two anchor members 16. Furthermore, in the embodiment the wing elements 14 and 15 are molded by stereolithography, but it is also possible to mold them by another method. Moreover, the test wing W is not limited to one simulating a main wing of an actual airplane; it can also simulate an empennage, and it is also possible for it to simulate a wing-shaped part provided on a building or a bridge.

As hereinbefore described, in accordance with the embodiment of the invention described above, since the connecting means for connecting the wing elements to the elastic spar is disposed within the wing elements, the connecting means is not exposed on the surface of the test wing, and when a flutter test is carried out in a wind tunnel the airflow over the surface of the test wing is not disturbed by the connecting means, thereby enhancing the accuracy of the flutter test.

Furthermore, in accordance with the embodiment of the invention described above, since a wing element is fitted from the wing tip side around the elastic spar and the anchor member fixed to the elastic spar, and the wing element is fastened to the anchor member by means of a bolt that is inserted from the wing tip side, the anchor member and the bolt are not exposed on the surface of the test wing, thereby easily and reliably fixing the wing element to the elastic spar.

Furthermore, in accordance with the embodiment of the invention described above, since the weight is supported in the weight support hole formed in the wing element or the anchor member, an accurate flutter test can be carried out by simulating the weight distribution of an actual wing.

What is claimed is:

1. A flutter test model, comprising:
   an elastic spar that simulates an elasticity of an actual wing;
   a plurality of wing elements that simulate an external shape of the actual wing, the plurality of wing elements being fixed along the elastic spar so as to form a test wing; and
   connecting means for connecting the wing elements to the elastic spar, the connecting means being disposed within the wing elements, wherein the connecting means are interior to an exterior surface of the test wing.

2. The flutter test model according to claim 1, wherein the connecting means comprises:
   an anchor member that is fixed to the elastic spar; and
   a bolt that fixes a wing element of the plurality of wing elements to the anchor member, the wing element being fitted around the elastic spar and the anchor member from a wing tip side, and the bolt passing through the wing element from the wing tip side and being fastened to the anchor member.

3. The flutter test model according to claim 2, wherein one of the wing element and the anchor member includes a weight disposed within a weight support hole.

4. The flutter test model according to claim 1, wherein said wing element is formed by stereolithography.

5. A flutter test model comprising:
   an elastic spar that simulates an elasticity of an actual wing;
   a plurality of wing elements that simulate an external shape of the actual wing, wherein the plurality of the wing elements are fixed along the elastic spar so as to form a test wing;
   a plurality of anchor members that are fixed to the elastic spar; and
   a plurality of engaging members that fix each of the plurality of wing elements to each of the plurality of anchor members, wherein each of the plurality of wing elements are fitted around the elastic spar, and each of the plurality of engaging members are engaged with each of the plurality of anchor members via a passage in each of the plurality of wing members, the passage passing through each of the plurality of wing members from a wing tip side and is disposed within an interior of an exterior surface of the actual wing.

6. The flutter test model according to claim 5, wherein the engagement members comprise bolts.

7. The flutter test model according to claim 5, wherein one of the wing elements and the anchor members includes a weight disposed within a weight support hole.

8. The flutter test model according to claim 5, wherein said wing element is formed by stereolithography.

9. A flutter test model comprising:
   an elastic spar that simulates an elasticity of an actual wing and extends in a span direction;
   a plurality of wing elements that simulate an external shape of the actual wing, the plurality of wing elements being fixed along the elastic spar so as to surround the elastic spar and form a test wing; and
   connecting means for connecting the wing elements to the elastic spar, the connecting means being entirely disposed within the wing elements so as to be interior to an exterior surface of the test wing.

10. The flutter test model according to claim 9, wherein the connecting means comprises:
    an anchor member that is fixed to the elastic spar; and
    a bolt that fixes a wing element of the plurality of wing elements to the anchor member, the wing element being fitted around the elastic spar and the anchor member from a wing tip side, and the bolt passing through the wing element from the wing tip side and being fastened to the anchor member.

11. The flutter test model according to claim 10, wherein one of the wing element and the anchor member includes a weight disposed within a weight support hole.

12. The flutter test model according to claim 9, wherein said wing element is formed by stereolithography.

* * * * *